United States Patent
Liu

(10) Patent No.: US 11,424,826 B2
(45) Date of Patent: Aug. 23, 2022

(54) DATA-RECEIVING CIRCUIT OF INFRARED RECEIVER AND DATA-RECEIVING METHOD THEREOF

(71) Applicant: Nuvoton Technology Corporation, Hsinchu (TW)

(72) Inventor: Tse-Yen Liu, Taipei (TW)

(73) Assignee: NUVOTON TECHNOLOGY CORPORATION, Hsinchu Science Park (TW)

(*) Notice: Subject to any disclaimer, the term of this patent is extended or adjusted under 35 U.S.C. 154(b) by 52 days.

(21) Appl. No.: 17/137,989

(22) Filed: Dec. 30, 2020

(65) Prior Publication Data

US 2022/0045752 A1 Feb. 10, 2022

(30) Foreign Application Priority Data

Aug. 4, 2020 (TW) ................................. 109126303

(51) Int. Cl.
| | | |
|---|---|---|
| *H04B 10/114* | (2013.01) | |
| *H04B 10/112* | (2013.01) | |
| *G06F 13/28* | (2006.01) | |
| *G08C 23/04* | (2006.01) | |
| *G06F 1/3209* | (2019.01) | |
| *G06F 13/38* | (2006.01) | |

(52) U.S. Cl.
CPC ......... *H04B 10/112* (2013.01); *G06F 1/3209* (2013.01); *G06F 13/28* (2013.01); *G06F 13/385* (2013.01); *G08C 23/04* (2013.01); *H04B 10/1141* (2013.01)

(58) Field of Classification Search
CPC ................ H04B 10/114–1149; G08C 23/04
See application file for complete search history.

(56) References Cited

U.S. PATENT DOCUMENTS

| 7,630,645 B2 * | 12/2009 | Hong ................. H04B 10/1149 398/107 |
| 2004/0059531 A1 * | 3/2004 | Tomida .................. G08C 17/00 702/79 |

FOREIGN PATENT DOCUMENTS

| CN | 101489062 | * | 7/2009 | ............... H04N 5/44 |
| CN | 111065986 A | | 4/2020 | |
| TW | 201110586 A | | 3/2011 | |
| TW | M-466428 U | | 11/2013 | |
| WO | WO2021017527 | * | 2/2021 | ............... H04L 1/18 |

OTHER PUBLICATIONS

Office Action dated Nov. 26, 2021 in TW Application No. 109126303, 5 pages.

* cited by examiner

*Primary Examiner* — Nathan M Cors
(74) *Attorney, Agent, or Firm* — Muncy, Geissler, Olds & Lowe, P.C.

(57) ABSTRACT

A data-receiving circuit adapted to an electronic device is provided herein. The electronic device receives a power-saving signal to operate in a power-saving mode. The data-receiving circuit includes a first register, a second register, a decoder, a data register, and a control circuit. The first register is configured to store a target value. The second register is configured to store the length of the target value. The decoder captures control data and endpoint data from an IR signal. The data register is configured to store the control data. The control circuit empties out the data register according to the power-saving signal and the endpoint signal.

10 Claims, 3 Drawing Sheets

DATA-RECEIVING CIRCUIT OF INFRARED RECEIVER AND DATA-RECEIVING METHOD THEREOF

CROSS REFERENCE TO RELATED APPLICATIONS

This application claims priority of Taiwan Patent Application No. 109126303, filed on Aug. 4, 2020, the entirety of which is incorporated by reference herein.

BACKGROUND OF THE INVENTION

Field of the Invention

The disclosure relates generally to data-receiving circuits and data-receiving methods thereof, and more particularly it relates to the data-receiving circuits of an infrared receiver and data-receiving methods thereof.

Description of the Related Art

A customized IR receiver is a common technology in today's daily life. Many electronic devices utilize a controllable infrared receiver as a receiver for remote control. When the circuit is moving towards low-power design, in order to achieve a goal of power consumption reduction, a custom infrared receiver is also used to wake up electronic devices from the power-saving mode. Under this demand, how the custom infrared receiver in the power-saving mode to "independently" and "correctly" receive the infrared transmission data and to wake up the electronic device has become an important issue.

BRIEF SUMMARY OF THE INVENTION

Data receiving devices for IR signal and methods thereof are provided herein. With the omission of the header in the IR signal, the electronic devices can be successfully waked up by the IR signal. The data register can be emptied according to the endpoint data of the IR signal in order to receive the subsequent IR signal.

In an embodiment, a data-receiving circuit adapted to an electronic device is provided herein. The electronic device receives a power-saving signal to operate in a power-saving mode. The data-receiving circuit comprises a first register, a second register, a decoder, a data register, and a control circuit. The first register is configured to store a target value. The second register is configured to store the length of the target value. The decoder captures control data and endpoint data from an IR signal. The data register is configured to store the control data. The control circuit empties out the data register according to the power-saving signal and the endpoint signal.

According to an embodiment of the invention, the data-receiving circuit further comprises a first comparison circuit. The first comparison circuit compares the control data to the target value. When the control data matches the target value, the first comparison circuit generates a first compare signal. The control circuit wakes up the electronic device from the power-saving mode to a normal operation mode according to the power-saving signal, the endpoint data, and the first compare signal.

According to an embodiment of the invention, the data-receiving circuit further comprises a counter. The counter counts a bit count of the control data. The control circuit further resets the counter according to the power-saving signal and the endpoint data.

According to an embodiment of the invention, the data-receiving circuit further comprises a second comparison circuit. The second comparison circuit compares the bit count to the length. When the bit count matches the length, the second comparison circuit generates a second compare signal. The control circuit further wakes up the electronic device from the power-saving mode to the normal operation mode according to the power-saving signal, the endpoint data, the first compare signal, and the second compare signal.

According to an embodiment of the invention, the data-receiving circuit receives the IR signal through an IR receiver.

According to an embodiment of the invention, a user stores the target value in the first register through a CPU.

In an embodiment, a data receiving method adapted to an electronic device is provided herein. The electronic device receives a power-saving signal to operate in a power-saving mode. The data receiving method comprises setting a target value; storing the length of the target value; receiving an IR signal; capturing control data and endpoint data from the IR signal, wherein the control data is stored in a data register; and emptying the data register according to the power-saving signal and the endpoint data.

According to an embodiment of the invention, the data receiving method further comprises comparing the control data to the target value; when the control data matches the target value, generating a first compare signal; and waking up the electronic device from the power-saving mode to a normal operation mode according to the power-saving signal, the endpoint signal, and the first compare signal.

According to an embodiment of the invention, the data receiving method further comprises counting a bit count of the control data; and resetting the bit count according to the power-saving signal and the endpoint data.

According to an embodiment of the invention, the data receiving method further comprises comparing the bit count to the length; when the bit count matches the length, generating a second compare signal; and waking up the electronic device from the power-saving mode to the normal operation mode according to the power-saving signal, the endpoint data, the first compare signal, and the second compare signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
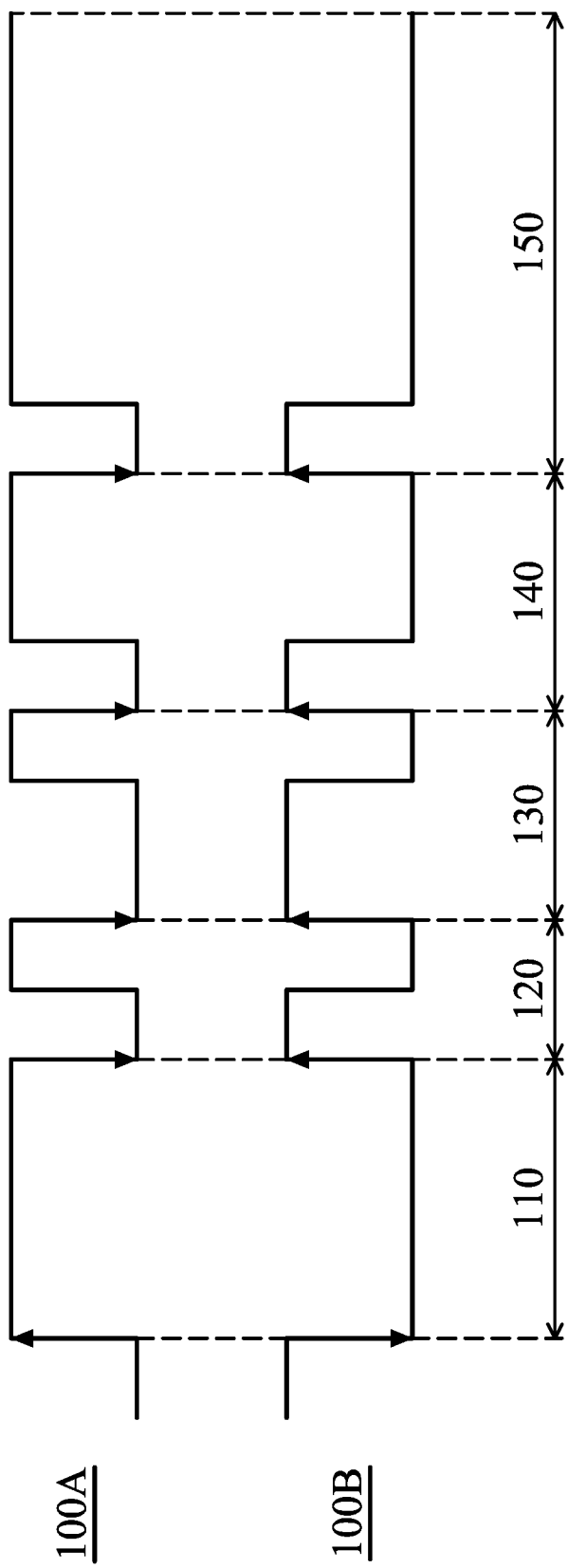
FIG. 1 illustrates an IR signal received by a custom IR receiver.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 illustrates an IR signal received by a custom IR receiver. As shown in FIG. 1, each of the IR signal 100A and the IR signal 100B includes the header 110, the first data 120, the second data 130, the special data 140, and the endpoint data 150. The header 110 is configured to inform the IR receiver to begin receiving the data and to initialize the internal data. The first data 120 and the second data 130 respectively represent logic 0 and logic 1 in digital signal. The special data 140 is configured to execute special functions. The endpoint data 150 indicates that the transmission is finished. In other words, the duty cycle of a pulse signal is configured to represent logic 0 and logic 1. According to an embodiment of the invention, the IR signal 100A is an inverse of the IR signal 100B.

In order to reduce the length of the IR signal, the header 110 can be omitted. In other words, IR signal 100A and the IR signal 100B only include the first data 120, the second data 130, the special data 140, and the endpoint data 150. Since the omission of the header 110 will inevitably bring design difficulties, the following paragraphs will describe in detail how to overcome the technical problems caused by the IR signal 100A and the infrared signal 100B with the omission of the header 110.

Figure 2:
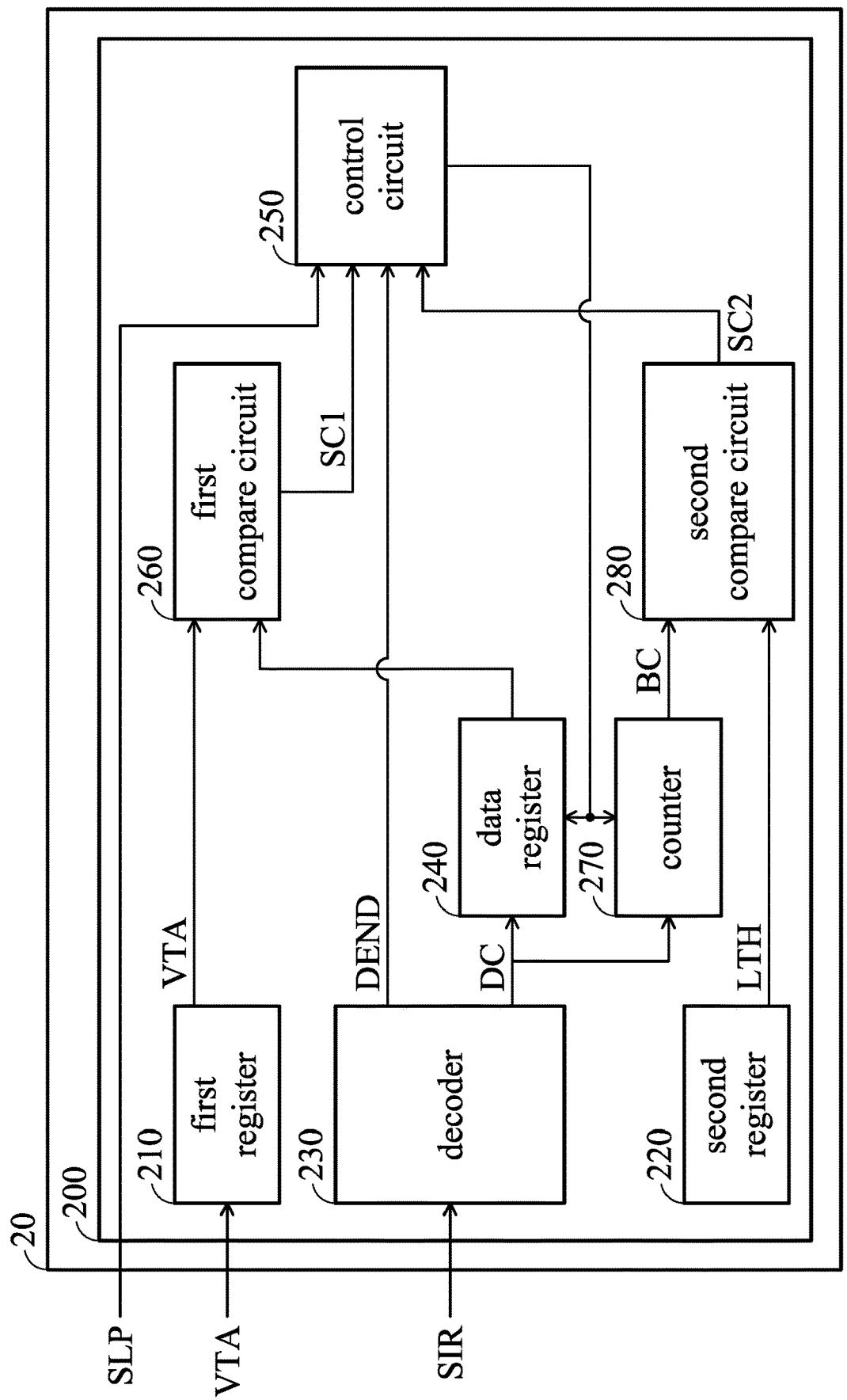
FIG. 2 is a block diagram of a data-receiving circuit in accordance with an embodiment of the invention.

FIG. 2 is a block diagram of a data-receiving circuit in accordance with an embodiment of the invention. As shown in FIG. 2, the data-receiving circuit 200 is in the electronic device 20, in which the electronic device 20 operates in the power-saving mode according to the power-saving signal SLP. The data-receiving circuit 200 includes a first register 210, a second register 220, a decoder 230, a data register 240, and a control circuit 250.

The first register 210 is configured to store the target value VTA. According to an embodiment of the invention, the user may store the target value VTA in the first register 210 through the CPU of the electronic device 20 in a manner of software. The second register 220 is configured to store a length LTH of the target value VTA. According to an embodiment of the invention, the data-receiving circuit 200 further includes a counter (not shown in FIG. 1), which is configured to count the bit count of the target value VTA and to store the length LTH in the second register 220.

The decoder 230 captures the control data DC and the endpoint data DEND from the IR signal SIR. According to an embodiment of the invention, the IR signal SIR is received by an IR receiver. According to an embodiment of the invention, the format of the IR signal SIR is shown in FIG. 1, in which the IR signal SIR does not have the header 110.

The data register 240 is configured to store the control data DC captured by the decoder 230. According to an embodiment of the invention, the control data DC is consisted of a series of the first data 120 and the second data 130. The control circuit 250 empties out the data register 240 according to the power-saving signal SLP and the endpoint data DEND. In other words, when the electronic device 20 operates in the power-saving mode and the control circuit 250 once receives the endpoint data 150 of the IR signal 100A and the IR signal 100B, it indicates that the data-receiving circuit 200 receives an effective IR signal so that the data-receiving circuit 200 empties the data register 240 in order to receive the next IR signal SIR.

As shown in FIG. 2, the data-receiving circuit 200 further includes a first comparison circuit 260. The first comparison circuit 260 is configured to compare the control data DC to the target value VTA. When the first comparison circuit 260 determines that the control data DC matches the target value VTA, the first comparison circuit 260 generates the first compare signal SC1. According to an embodiment of the invention, the control circuit 250 wakes up the electronic device 20 from the power-saving mode back to the normal operation mode according to the power-saving signal SLP, the endpoint data DEND and the first compare signal SC1.

In other words, when the electronic device 20 operates in the power-saving mode and the control circuit 250 receives the endpoint data 150 of the IR signal 100A and the IR signal 100B, the first comparison circuit 260 further determines that the control data DC matches the target value VTA. It indicates that the IR signal SIR is the wake-up signal of the electronic device 20 so that the control circuit 250 wakes up the electronic device 20 from the power-saving mode. According to another embodiment of the invention, when the control circuit 250 wakes up the electronic device 20, the control circuit 250 further empties out the data register 250 in order to receive the next IR signal SIR.

As shown in FIG. 2, the data-receiving circuit 20 further includes a counter 270. The counter 270 is configured to count the bit count BC of the control data DC and to store the bit count BC. According to another embodiment of the invention, the control circuit 250 empties out the data register 240 and resets the counter 270 according to the power-saving signal SLP and the endpoint data DEND. In other words, when the electronic device 20 operates in the power-saving mode and the control circuit 250 once receives the endpoint data 150 of the IR signal 100A and the IR signal 100B, it indicates that the data-receiving circuit 200 receives an effective IR signal so that the data register 240 is emptied and the counter 270 is reset in order to receive the next IR signal SIR.

As shown in FIG. 2, the data-receiving circuit 200 further includes a second comparison circuit 280. The second comparison circuit 280 is configured to compare the bit count BC to the length LTH. When the second comparison circuit 280 determines that the bit count BC matches the length LTH, the second comparison circuit 280 generates the second compare signal SC2. According to another embodiment of the invention, the control circuit 250 wakes up the electronic device 20 from the power-saving mode back to the normal operation mode according to the power-saving signal SLP, the endpoint data DEND, the first compare signal SC1 and the second compare signal SC2.

In other words, when the electronic device 20 operates in the power-saving mode and the control circuit 250 receives the endpoint data 150 of the IR signal 100A and the IR signal 100B, the first comparison circuit 260 determines that the control data DC matches the target value VTA and the second comparison circuit 280 also determines that the bit count BC matches the length LTH, which assures that the IR signal SIR is indeed the wake-up signal of the electronic device 20. Therefore, the control circuit 250 wakes up the electronic device 20 from the power-saving mode. According to another embodiment of the invention, when the control circuit 250 wakes up the electronic device 20, the control circuit 250 further empties out the data register 240 and resets the counter 270 in order to receive the next IR signal SIR.

Figure 3:
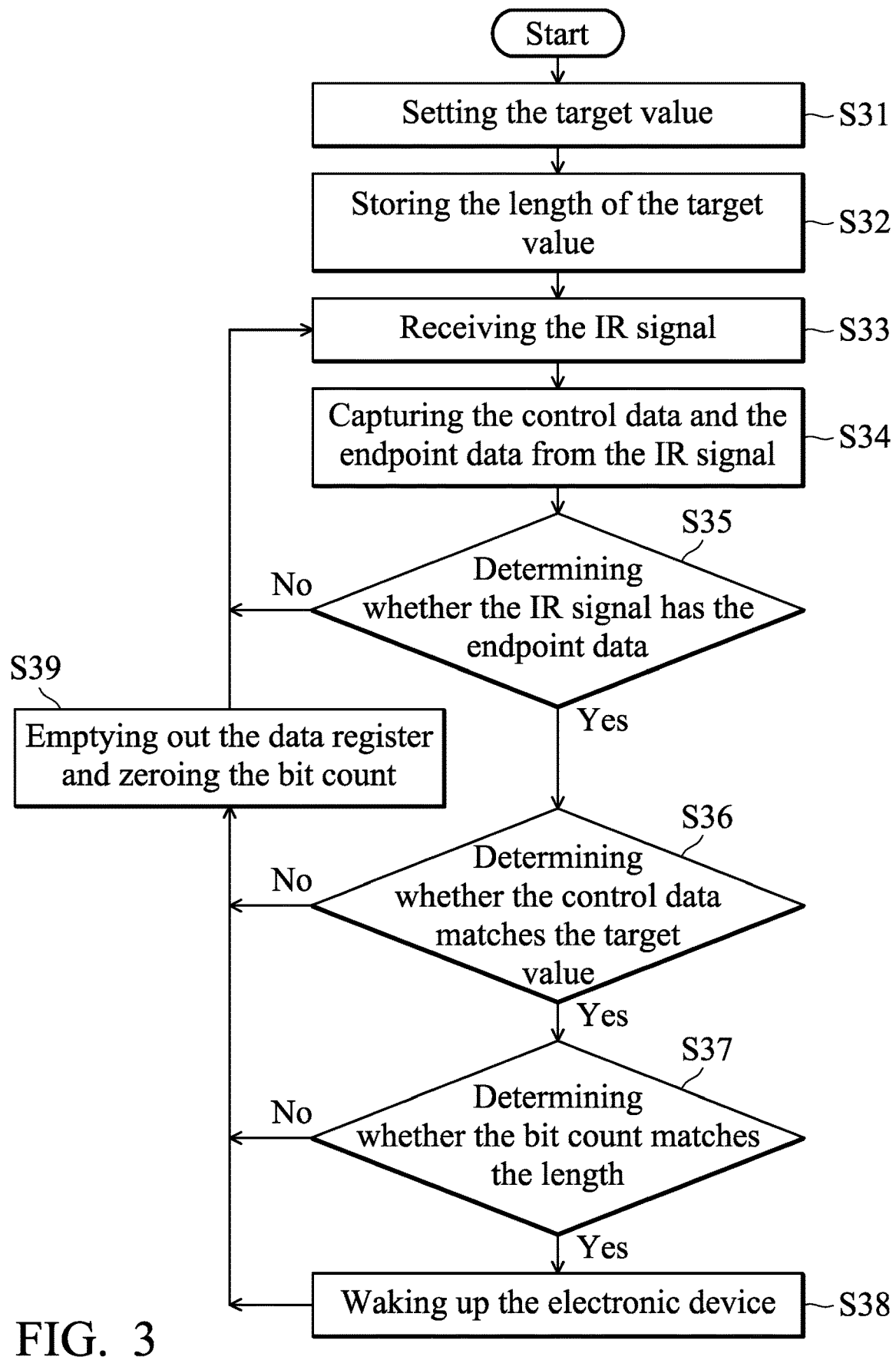
FIG. 3 is a flow chart of a data receiving method in accordance with an embodiment of the invention.

FIG. 3 is a flow chart of a data receiving method in accordance with an embodiment of the invention. The following description to the data receiving method 300 in FIG. 3 will be accompanied with the schematic diagram of IR signal in FIG. 1 and the block diagram of data receiving device in FIG. 2 for explanation in detail.

According to an embodiment of the invention, the data receiving method 300 is adapted to the electronic device 20 operating in the power-saving mode SLP according to the power-saving signal SLP. As shown in FIG. 3, the user sets the target value VTA (Step S31), and the length LTH of the target value VTA is stored (Step S32). According to an embodiment of the invention, the target value VTA is the control data DC configured to wake up the electronic device 20. Namely, when the control circuit 250 determines that the control data DC matches the target value VTA, the control circuit 250 wakes up the electronic device 20.

The IR signal SIR is received (Step S33). According to an embodiment of the invention, the IR signal SIR does not have the header 110 of the IR signal 100A or the IR signal 100B. By using the decoder 230, the control data DC and the endpoint data DEND are captured from the IR signal SIR (Step S34), and the control data DC is stored in the data register 240.

The control circuit 250 determines whether the IR signal SIR has the endpoint data DEND (Step S35). When it is determined that the RI signal SIR has the endpoint data DEND, the first comparison circuit 260 determines whether the control data DC matches the target value VTA (Step S36). When it is determined that the control data DC matches the target value VTA, the second comparison circuit 280 determines whether the bit count BC matches the length LTH (Step S37).

When it is determined that the bit count BC matches the length LTH, the control circuit 250 wakes up the electronic device 20 from the power-saving mode (Step S38), empties out the data register 240 and resets the bit count BC (Step S39). Then, Step S33 is returned to receive the next IR signal.

Back to Step S36, when it is determined that the control data DC does not match the target value VTA, the control circuit 250 empties out the data register 240 and resets the bit count BC (Step S39). Then, Step S33 is returned to receive the next IR signal.

Back to Step S37, when it is determined that the bit count BC does not match the length LTH, the control circuit 250 empties the data register 240 and resets the bit count BC (Step S39). Then, Step S33 is returned to receive the next IR signal.

According to another embodiment of the invention, Step S36 and Step S37 can be executed simultaneously. Namely, when it is determined that the control data DC matches the target value VTA and that the bit count BC matches the length LTH, the control circuit 250 wakes up the electronic device 20 from the power-saving mode (Step S38), empties the data register 240 and resets the bit count BC (Step S39). Then, Step S33 is returned to receive the next IR signal. When it is determined that the control data DC does not match the target value VTA or that the bit count BC does not match the length LTH, the control circuit 250 empties the data register 240 and resets the bit count BC (Step S39). Then, Step S33 is returned to receive the next IR signal.

According to another embodiment of the invention, the order of step S36 and step S37 can be reversed. Namely, it is first determined whether the bit count BC matches the length LTH and then determined whether the control data DC matches the target value VTA.

Data receiving devices for IR signal and methods thereof are provided herein. With the omission of the header in the IR signal, the electronic devices can be successfully waked up by the IR signal. The data register can be emptied according to the endpoint data of the IR signal in order to receive the subsequent IR signal.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A data-receiving circuit adapted to an electronic device, wherein the electronic device receives a power-saving signal to operate in a power-saving mode, wherein the data-receiving circuit comprises:
a first register, configured to store a target value;
a second register, configured to store a length of the target value;
a decoder, capturing control data and endpoint data from an IR signal;
a data register, configured to store the control data; and
a control circuit, emptying out the data register according to the power-saving signal and the endpoint data.

2. The data-receiving circuit as defined in claim 1, further comprising:
a first comparison circuit, comparing the control data to the target value, wherein when the control data matches the target value, the first comparison circuit generates a first compare signal, wherein the control circuit wakes up the electronic device from the power-saving mode to a normal operation mode according to the power-saving signal, the endpoint data, and the first compare signal.

3. The data-receiving circuit as defined in claim 2, further comprising:
a counter, counting a bit count of the control data, wherein the control circuit further resets the counter according to the power-saving signal and the endpoint data.

4. The data-receiving circuit as defined in claim 3, further comprising:
a second comparison circuit, comparing the bit count to the length, wherein when the bit count matches the length, the second comparison circuit generates a second compare signal, wherein the control circuit further wakes up the electronic device from the power-saving mode to the normal operation mode according to the power-saving signal, the endpoint data, the first compare signal, and the second compare signal.

5. The data-receiving circuit as defined in claim 1, wherein the data-receiving circuit receives the IR signal through an IR receiver.

6. The data-receiving circuit as defined in claim 1, wherein a user stores the target value in the first register through a CPU.

7. A data receiving method adapted to an electronic device, wherein the electronic device receives a power-saving signal to operate in a power-saving mode, wherein the data receiving method comprises:
setting a target value;
storing a length of the target value;
receiving an IR signal;
capturing control data and endpoint data from the IR signal, wherein the control data is stored in a data register; and
emptying the data register according to the power-saving signal and the endpoint data.

8. The data receiving method as defined in claim 7, further comprising:
comparing the control data to the target value;
when the control data matches the target value, generating a first compare signal; and
waking up the electronic device from the power-saving mode to a normal operation mode according to the power-saving signal, the endpoint signal, and the first compare signal.

9. The data receiving method as defined in claim 8, further comprising:
counting a bit count of the control data; and
resetting the bit count according to the power-saving signal and the endpoint data.

10. The data receiving method as defined in claim 9, further comprising:
comparing the bit count to the length;
when the bit count matches the length, generating a second compare signal; and
waking up the electronic device from the power-saving mode to the normal operation mode according to the power-saving signal, the endpoint data, the first compare signal, and the second compare signal.

* * * * *